United States Patent Office 3,121,741
Patented Feb. 18, 1964

3,121,741
PROCESS FOR THE PRODUCTION OF L-LYSINE AND SALTS THEREOF
Carl Max Brenner, Riehen, near Basel, Switzerland, and Marcus A. Stevens, Wilmslow, England, assignors to J. R. Geigy A.-G., Basel, Switzerland
No Drawing. Filed Apr. 18, 1962, Ser. No. 188,540
Claims priority, application Switzerland Apr. 19, 1961
8 Claims. (Cl. 260—534)

The present invention concerns a new, direct process for the production of the important aminoacid L-lysine, from L-α-amino-ε-caprolactam - L - 2-pyrrolidone-5-carboxylate, and salts thereof.

M. Brenner and H. R. Rickenbacher have shown (Angew. Chemie 68, 688 (1957), Chimia 11, 293 (1957), and Helv. Chim. Acta 41, 181 (1958), that there is a simple way to produce L-lysine, an amino acid which is important for nutrition, by starting by DL-α-amino-ε-caprolactam, which latter substance can be produced by various methods from the marketed product ε-caprolactam. In order to produce L-lysine from DL-α-amino-ε-caprolactam, Brenner and Rickenbacher first prepared the insoluble salt of L-α-amino-ε-caprolactam with L-2-pyrrolidone-5-carboxylic acid and separated it from the soluble D-α-amino-ε-caprolactam - L-2-pyrrolidone-5-carboxylate. They then isolated the L-α-amino-ε-caprolactam from the L-α-amino-ε-caprolactam-L-2-pyrrolidone-5-carboxylate by a process involving several steps using hydrochloric acid in dioxan and barium methylate in methanol and finally hydrolysed the L-α-amino-ε-caprolactam to L-lysine hydrochloride by boiling with hydrochloric acid.

A more elegant and direct way of obtaining L-lysine from L-α-amino-ε-caprolactam - L-2-pyrrolidone-5-carboxylate has now been found in which a plurality of operations, costly solvents such as dioxan and the use of apparatus which is very stable to corrosion can be avoided.

The process according to the invention is characterized by absorbing L-α-amino-ε-caprolactam component from a solution of L-α-amino-ε-caprolactam-L-2-pyrrolidone-5-carboxylate onto 3 to 6 times the equivalent amount of the acid form of a sulphonic acid exchange resin (by "equivalent amount" it is meant the amount of resin neutralized by one equivalent of L-α-amino-ε-caprolactam-L-2-pyrrolidone-5-carboxylate), then heating the resin for 6 to 12 hours at a temperature between 90° C. and 120° C. in the presence of an amount of $\frac{1}{10}$ to $\frac{1}{2}$ equivalent of mineral acid e.g. hydrochloric acid, sulphonic acid, phosphoric acid (preferably hydrochloric acid), calculated on the L-α-amino-ε-caprolactam adsorbed, the concentration of this acid being from 0.01 to 0.5 N, and then extracting the L-lysine formed in the form of the free base or of a salt from the resin in the known manner by elution.

It is surprising that L-lysine which can be used for nutrition can be obtained in a pure form by this process as R. D. Emmick, K. O. Hambrock and A. O. Rogers (U.S. Patent No. 2,536,360) have described that optically active lysine is racemised by acid resins at temperatures between 100–230° C., this in particular by resins containing sulphonic acid groups. In spite of this statement and the prejudice arising therefrom, when the conditions cited above are complied with, it is possible by adsorption of optically active L-α-amino-ε-caprolactam and heating it, to produce unracemised optically active L-lysine in a simple manner.

In the preferred form of the process according to the invention, an aqueous solution of L-α-amino-ε-caprolactam-L-2-pyrrolidone-5-carboxylate is passed through a column prepared with the acid form (H+) of a sulphonic acid resin having a polystyrene base, such as, e.g. "Dowex" 50 resins of Dow Chemical Corporation or "IRA 120" of Rohm & Haas Corporation. The L-2-pyrrolidone-5-carboxylic acid passes through the resin column and can be regained for the production of further quantities of starting salt. The L-α-amino-ε-caprolactam, however, remains adsorbed in the resin column.

Thus, in order to effect this adsorption in practice, a sulphonic acid resin is required and this resin should be used in 3 to 6 times the theoretical amount required for the adsorption of the L-α-amino-ε-caprolactam in the L-α-amino-ε-caprolactam-L-2-pyrrolidone - 5 - carboxylate. If between 1 and 3 resin equivalents are used, the L-lysine obtained at the end of the hydrolysis is not optically pure. If more than 6 resin equivalents are used, this increases the costs of the process unnecessarily as greater amounts of resin must be used and greater amounts of solvent than are necessary for the elution must be evaporated before the L-lysine can be obtained in the undissolved form. In practice, the most advantageous results are obtained on using about 4 times the theoretical amount of resin.

In order to obtain pure L-lysine as end product according to the invention, it is necessary to heat the resin after the adsorption of the L-α-amino-ε-caprolactam in the presence of a small amount of mineral acid, advantageously hydrochloric acid. Thus, before or during the heating, mineral acid is added in order to more equally distribute the L-α-amino-ε-caprolactam in the resin column. The mineral acid used for this purpose should be diluted, the best concentration is between 0.01 and 0.5 N, and it should be used in amounts which do not cause elution of α-amino-ε-caprolactam and L-lysine from the resin. In a preferred form of the process according to the invention, an amount of 0.05 N-hydrochloric acid is added before or during the heating period to the resin loaded with L-α-amino-ε-caprolactam which corresponds to a fifth acid equivalent per originally adsorbed L-α-amino-ε-caprolactam. This amount and the concentration resulting therefrom are so low that no elution of L-α-amino-ε-caprolactam or L-lysine from the resin occurs, particularly as the elution of basic substances from sulphonic acid resins generally necessitates strong acids and considerably greater amounts of acid than one equivalent. The amount of mineral acid which should be present during the heating or hydrolysis period lies between $\frac{1}{10}$ and $\frac{1}{2}$ equivalent at a concentration between 0.01 and 0.5 N. Higher concentrations of acid are not desirable as, among other things, they tend to affect the apparatus.

To hydrolyse the L-α-amino-ε-caprolactam adsorbed onto the resin, the contents of the column are heated for 6 to 12 hours at a temperature between 90° C. and 120° C., advantageously at about 100° C., whereupon the L-lysin is obtained in the ion form on the resin. More energetic conditions are not desirable as they lead to lysine which is not optically pure whilst the use of milder conditions leads to L-lysine which is contaminated by a content of L-α-amino-ε-caprolactam.

Although sulphonic acid exchange resins of the types as exemplified by "Dowex 50" and "IRA 120" are preferred, other sulphonic acid exchange resins that could be used are e.g. Duolite C–10, Duolite C–20, Duolite C–25 of Chemical Process Company; Permutits Q and Zeo-Karb of the Permutit Company; Lewatit KS and Lewatit PN of the Farbenfabriken Bayer A.G.

The elution of the L-lysine so formed on the resin is performed in the known and conventional manner, e.g. by using mineral acids such as sulphuric acid, phosphoric acid or hydrochloric acid (hydrochloric acid being preferred) or ammoniacal solutions e.g. ammonia in water, whereupon the L-lysine is extracted from the resin either in the form of an acid addition salt when eluting with acids or as the free base when eluting with ammoniacal solutions. On eluting with ammonical solutions, the free lysine can be converted into the corresponding salt by treatment with an appropriate acid e.g. mineral acid such as hydrochloric acid.

The following example further illustrates the process according to the invention. The temperatures are given in degrees centigrade.

*Example*

A solution of 1 g. of L-α-amino-ε-caprolactam-L-2-pyrrolidone-5-carboxylate in 40 ml. of water is eluted through an 8 ml. column of freshly activated "Dowex 50–X8" ion exchange resin in the acid form. After the solution has passed through, the column is washed with distilled water until the eluate is neutral. After evaporation of the eluate, a quantitative amount of L-2-pyrrolidone-5-carboxylic acid (M.P. 154–161°) is regained. 15 ml. of a 0.05 N-hydrochloric acid are then added to the moist resin column which is then heated for 8 hours at 98° by external steam. After cooling, the resin is washed with distilled water until the eluate is neutral whereupon it is eluted with a 10% ammonia solution (80 ml.) at a rapidity of 2.7 ml. per minute. After evaporating the ammoniacal eluate, neutralising the free L-lysine which remains with an excess of 2 N-hydrochloric acid and again evaporating, 780 mg. of L-lysine dihydrochloride are obtained. It is both chromatographically and optically pure. M.P. 200–202°; $[\alpha]_D^{25} = +25.5°$ (c.=2 in 6 N-HCl). In the literature (S. Birnbaum, L. Levingtow, R. B. Kingsley and J. P. Greenstein, J. Biol. Chem. 194, 455 (1952), give the optical rotation as $[\alpha]_D^{25.9} = +25.9°$ (c.=2 in 6 N-HCl).

*Analysis.*—Found: C, 33.00; H, 7.35; N, 12.52%. Calculated for the formula $C_6H_{16}O_2N_2Cl_2$: C, 32.90; H, 7.36; N, 12.79%.

What is claimed is:

1. In a process for the production of mineral acid salt of L-lysine from L-α-amino-ε-caprolactam-L-2-pyrrolidone-5-carboxylate, the improvement comprising
    (1) contacting a solution of L-α-amino-ε-caprolactam-L-2-pyrrolidone-5-carboxylate, with 3 to 6 times the equivalent amount of the acid form of a sulfonic acid ion exchange resin, whereby the L-α-amino-ε-caprolactam moiety is adsorbed onto said resin,
    (2) heating the resin for 6 to 12 hours at a temperature between 90° C. and 120° C. in contact with one-tenth to one-half equivalent of mineral acid, said equivalent calculated on the weight of the adsorbed L-α-amino-ε-caprolactam, the concentration of said mineral acid being 0.01 to 0.5 N, thereby obtaining on the resin, an elutable product consisting essentially of L-lysine substantially free from racemic lysine, and
    (3) extracting the elutable product by elution with an excess of aqueous mineral acid solution, thereby obtaining a solution of the corresponding acid salt of L-lysine in an excess aqueous mineral acid.

2. In a process for the production of L-lysine from L-α-amino-ε-caprolactam-L-2-pyrrolidone-5-carboxylate, the improvement comprising
    (1) contacting a solution of L-α-amino-ε-caprolactam-L-2-pyrrolidone-5-carboxylate with 3 to 6 times the equivalent amount of the acid form of a sulfonic acid exchange resin, whereby the L-α-amino-ε-caprolactam moiety is adsorbed onto said resin,
    (2) heating the resin for 6 to 12 hours at a temperature between 90° C. and 120° C. in contact with one-tenth to one-half equivalent of mineral acid, said equivalent calculated on the weight of the adsorbed L-α-amino-ε-caprolactam, the concentration of said mineral acid being 0.01 to 0.5 N thereby obtaining on the resin, a elutable product consisting essentially of L-lysine substantially free from racemic lysine, and
    (3) extracting the elutable product by elution with aqueous ammoniacal solution.

3. Process according to claim 2 wherein the solution of L-α-amino-ε-caprolactam-L-2-pyrrolidone-5-carboxylate is an aqueous solution.

4. Process according to claim 2 wherein the sulphonic acid exchange resin is a sulphonated polystyrene.

5. Process according to claim 2 wherein the mineral acid is hydrochloric acid.

6. Process according to claim 1 wherein the solution of L-α-amino-ε-caprolactam-L-2-pyrrolidone-5-carboxylate is an aqueous solution.

7. Process according to claim 1 wherein the sulfonic acid exchange resin is a sulfonated polystyrene.

8. Process according to claim 1, wherein the mineral acid is hydrochloric acid.

References Cited in the file of this patent

UNITED STATES PATENTS

| | | |
|---|---|---|
| 2,556,907 | Emmick | June 12, 1951 |
| 2,955,109 | Brenner | Oct. 4, 1960 |

OTHER REFERENCES

Brenner: Chemical Abstracts, vol. 52, pages 16231–16233 (1958).

Nachod: Ion Exchange Technology, pages 277–282, 563–564 and 541 (1956).